(12) United States Patent
Sekiguchi

(10) Patent No.: US 11,655,888 B2
(45) Date of Patent: May 23, 2023

(54) DIFFERENTIAL DEVICE

(71) Applicant: MUSASHI SEIMITSU INDUSTRY CO., LTD., Toyohashi (JP)

(72) Inventor: Akuto Sekiguchi, Toyohashi (JP)

(73) Assignee: Musashi Saimitsu Industry Co., Ltd., Aichi (JP)

( * ) Notice: Subject to any disclaimer, the term of this patent is extended or adjusted under 35 U.S.C. 154(b) by 14 days.

(21) Appl. No.: 17/627,765

(22) PCT Filed: Jun. 10, 2020

(86) PCT No.: PCT/JP2020/022798
§ 371 (c)(1),
(2) Date: Jan. 17, 2022

(87) PCT Pub. No.: WO2021/024610
PCT Pub. Date: Feb. 11, 2021

(65) Prior Publication Data
US 2022/0268346 A1    Aug. 25, 2022

(30) Foreign Application Priority Data

Aug. 2, 2019    (JP) .............................. JP2019-143124

(51) Int. Cl.
*F16H 48/08* (2006.01)
*F16H 48/40* (2012.01)
*F16H 57/04* (2010.01)

(52) U.S. Cl.
CPC ............ *F16H 48/08* (2013.01); *F16H 48/40* (2013.01); *F16H 57/0483* (2013.01); *F16H 2048/087* (2013.01)

(58) Field of Classification Search
CPC .......... F16H 48/08; F16H 48/40; F16H 57/04; F16H 57/0483; F16H 2048/087
(Continued)

(56) References Cited

U.S. PATENT DOCUMENTS 7,867,126 B2 * 1/2011 Nakajima ........... F16H 57/0483
475/160
10,527,153 B2    1/2020 Okumoto et al.
(Continued)

FOREIGN PATENT DOCUMENTS

JP    H10-159943 A    6/1998
JP    2007-002885 A   1/2007
(Continued)

*Primary Examiner* — Leslie A Nicholson, III
(74) *Attorney, Agent, or Firm* — Carrier Shende & Associates, P.C.; Joseph P. Carrier; Fulchand P. Shende

(57) ABSTRACT

To maintain smooth rotation of a pinion gear, a differential device includes: a differential case including a case main body and a bearing boss protruding from the case main body and rotatably supported about a first rotation axis; a side gear; and a pinion gear. An introduction groove for introducing lubricating oil into the case main body is formed on the bearing boss. An inner surface groove communicating with the introduction groove and extending toward the pinion gear is formed on the case main body. The inner surface groove includes a first groove portion and a second groove portion positioned radially outward from the first groove portion in the radial direction. The shape of at least a part of the first groove portion is a shape over which the lubricating oil is hard to climb during vehicle forward movement as compared with the shape of the second groove portion.

20 Claims, 7 Drawing Sheets

(58) Field of Classification Search
USPC .......................................................... 475/230
See application file for complete search history.

(56) References Cited

U.S. PATENT DOCUMENTS

| 10,663,055 | B2 * | 5/2020 | Nakamura | .......... F16H 57/0427 |
| 10,859,151 | B2 * | 12/2020 | Kito | .................... F16H 57/0457 |
| 10,955,042 | B2 * | 3/2021 | Sadahiro | ................. F16H 48/40 |
| 11,300,197 | B2 * | 4/2022 | Takemoto | ........... F16H 57/0483 |

FOREIGN PATENT DOCUMENTS

| JP | 2007002885 A | * | 1/2007 | ......... F16H 57/0427 |
| JP | 2012-112516 A | | 6/2012 | |
| JP | 2015102161 A | * | 6/2015 | ............. F16H 3/663 |
| JP | 2017-116035 A | | 6/2017 | |
| JP | 2019-011849 A | | 1/2019 | |

* cited by examiner

DIFFERENTIAL DEVICE

TECHNICAL FIELD

The technique disclosed herein relates to a differential device.

BACKGROUND

A differential device includes a differential case and a differential mechanism housed in the differential case. The differential case has a case main body and a bearing boss. The case main body is provided with a housing space for housing the differential mechanism. The bearing boss protrudes from the case main body, has a cylindrical shape with a case through-hole communicating with the housing space of the case main body, and is rotatably supported around a first rotation axis. The differential mechanism has a side gear rotatably arranged around the first rotation axis and a pinion gear rotatably arranged around a second rotation axis perpendicular to the first rotation axis and meshing with the side gear. When the differential case is rotationally driven, the driving force thereof is transmitted to a drive shaft connected to the side gear via the pinion gear and the side gear.

To maintain smooth rotation of the pinion gear, there has been conventionally used a differential device having a configuration for supplying lubricating oil to the back surface side of the pinion gear (a space between the back surface of the pinion gear and the inner surface of the case main body). Specifically, in this conventional differential device, an introduction groove for introducing lubricating oil into the housing space of the case main body is formed on the inner peripheral surface of the bearing boss. In addition, an inner surface groove communicating with the introduction groove and extending toward the back surface side of the pinion gear is formed on the inner surface of the case main body. Thus, during the rotation of the differential case, the lubricating oil is supplied to the inner surface groove via the introduction groove. The supplied lubricating oil flows toward the back surface side of the pinion gear in the inner surface groove by centrifugal force applied to the rotating differential case and reaches the back surface of the pinion gear, thereby suppressing, for example, the occurrence of seizure or breakage of the back surface of the pinion gear and the inner surface of the case main body. As a result, it is possible to maintain the smooth rotation of the pinion gear (see, for example, Patent Document 1).

PRIOR ART REFERENCE

Patent Document 1: Japanese Unexamined Patent Application Publication No. 2012-112516

SUMMARY

Problem to be Solved by the Invention

In order to maintain the smooth rotation of the pinion gear, it is necessary to supply an appropriate amount of lubricating oil to the back surface side of the pinion gear, especially during vehicle forward movement. However, in the conventional differential device, since the shape of the inner surface groove has not been specially designed, the lubricating oil supplied from the introduction groove is wastefully scattered in the middle of the inner surface groove during the vehicle forward movement, and as a result, the amount of lubricating oil reaching the back surface of the pinion gear is reduced, so that it may not be possible to maintain smooth rotation of the pinion gear.

An object of the present invention is to provide a differential device capable of solving the above problems.

Means of Solving the Problem

A differential device disclosed herein includes: a differential case including a case main body in which a housing space is formed, and a bearing boss protruding from the case main body, having a cylindrical shape with a case through-hole communicating with the housing space, and being rotatably supported about a first rotation axis; a side gear housed in the housing space of the differential case and rotatably arranged about the first rotation axis; and a pinion gear housed in the housing space of the differential case, rotatably arranged about a second rotation axis perpendicular to the first rotation axis, and meshing with the side gear, wherein an introduction groove for introducing lubricating oil into the housing space of the case main body is formed on an inner peripheral surface of the bearing boss, wherein an inner surface groove communicating with the introduction groove and extending toward a back surface side of the pinion gear is formed on an inner surface of the case main body, wherein the inner surface groove includes a first groove portion and a second groove portion positioned radially outward from the first groove portion in the radial direction of the case main body, and wherein a shape of at least a part of the first groove portion is a shape over which the lubricating oil is harder to climb during vehicle forward movement as compared with the shape of the second groove portion.

In the differential device, the inner surface of the case main body is provided with the inner surface groove communicating with the introduction groove formed in the bearing boss, and this inner surface groove includes the second groove portion and the first groove portion. The second groove portion is arranged radially outward from the first groove portion. At least a part of the first groove portion has a shape over which the lubricating oil is harder to climb during the vehicle forward movement as compared with the shape of the second groove portion. Thus, during vehicle forward movement, it is possible to suppress wasteful scattering of the lubricating oil radially inwardly in the inner surface groove, facilitate the supply of the lubricating oil radially outward in the inner surface groove, increase the amount of the lubricating oil reaching the back surface of the pinion gear, and maintain smooth rotation of the pinion gear.

(2) In the differential device described above, an inner wall surface at the rear side of at least a part of the first groove portion in the forward rotational direction, which is the rotational direction of the differential case during the vehicle forward movement, may be steeper than an inner wall surface at the rear side of the second groove portion in the forward rotational direction. According to this differential device, with a relatively simple configuration in which, with regard to the second groove portion and the first groove portion, the steepness of the inner wall surface at the rear side in the forward rotational direction is made different from each other, it is possible to suppress wasteful scattering of the lubricating oil radially inwardly in the inner surface groove, facilitate the supply of the lubricating oil radially outward in the inner surface groove, increase the amount of the lubricating oil reaching the back surface of the pinion gear, and maintain smooth rotation of the pinion gear.

In the differential device described above, the inner surface groove may have a third groove portion positioned radially inward from the first groove portion, a shape of at least a part of the third groove portion may be a shape over which the lubricating oil is easier to climb during the vehicle forward movement as compared with the shape of the first groove portion, and the third groove portion may be covered with the back surface of the side gear. According to this differential device, in the inner surface groove, the third groove portion positioned further radially inward from the first groove portion has a shape over which the lubricating oil is easier to climb during the vehicle forward movement as compared with the first groove portion. Thus, it is possible to suppress wasteful scattering of the lubricating oil in the first groove portion, facilitate the supply of the lubricating oil radially outward in the inner surface groove, increase the amount of the lubricating oil reaching the back surface of the side gear, and maintain smooth rotation of the side gear.

(4) In the differential device described above, an inner wall surface at the rear side of at least a part of the third groove portion in the forward rotational direction, which is the rotational direction of the differential case during the vehicle forward movement, may be inclined more gently than an inner wall surface at the rear side of the first groove portion in the forward rotational direction. According to this differential device, with a relatively simple configuration in which, with regard to the first groove portion and the third groove portion, the steepness of the inner wall surface at the rear side in the forward rotational direction is made different from each other, it is possible to suppress wasteful scattering of the lubricating oil radially inwardly in the inner surface groove and to maintain smooth rotation of the pinion gear.

(5) In the differential device described above, the second groove portion may be covered with the back surface of the pinion gear. This differential device can suppress wasteful scattering of the lubricating oil radially inwardly in the inner surface groove until the lubricating oil reaches the back surface of the pinion gear, thereby increasing the amount of the lubricating oil reaching the back surface of the pinion gear and maintaining smooth rotation of the pinion gear more effectively.

(6) In the differential device described above, the first groove portion may be positioned between the back surface of the side gear and the back surface of the pinion gear. This differential device can suppress wasteful scattering of lubricating oil between the back surface side of the side gear and the back surface side of the pinion gear to supply sufficient lubricating oil to the back surface side of the pinion gear, thereby maintaining smooth rotation of the pinion gear.

DETAILED DESCRIPTION

A. Embodiment

Figure 1:
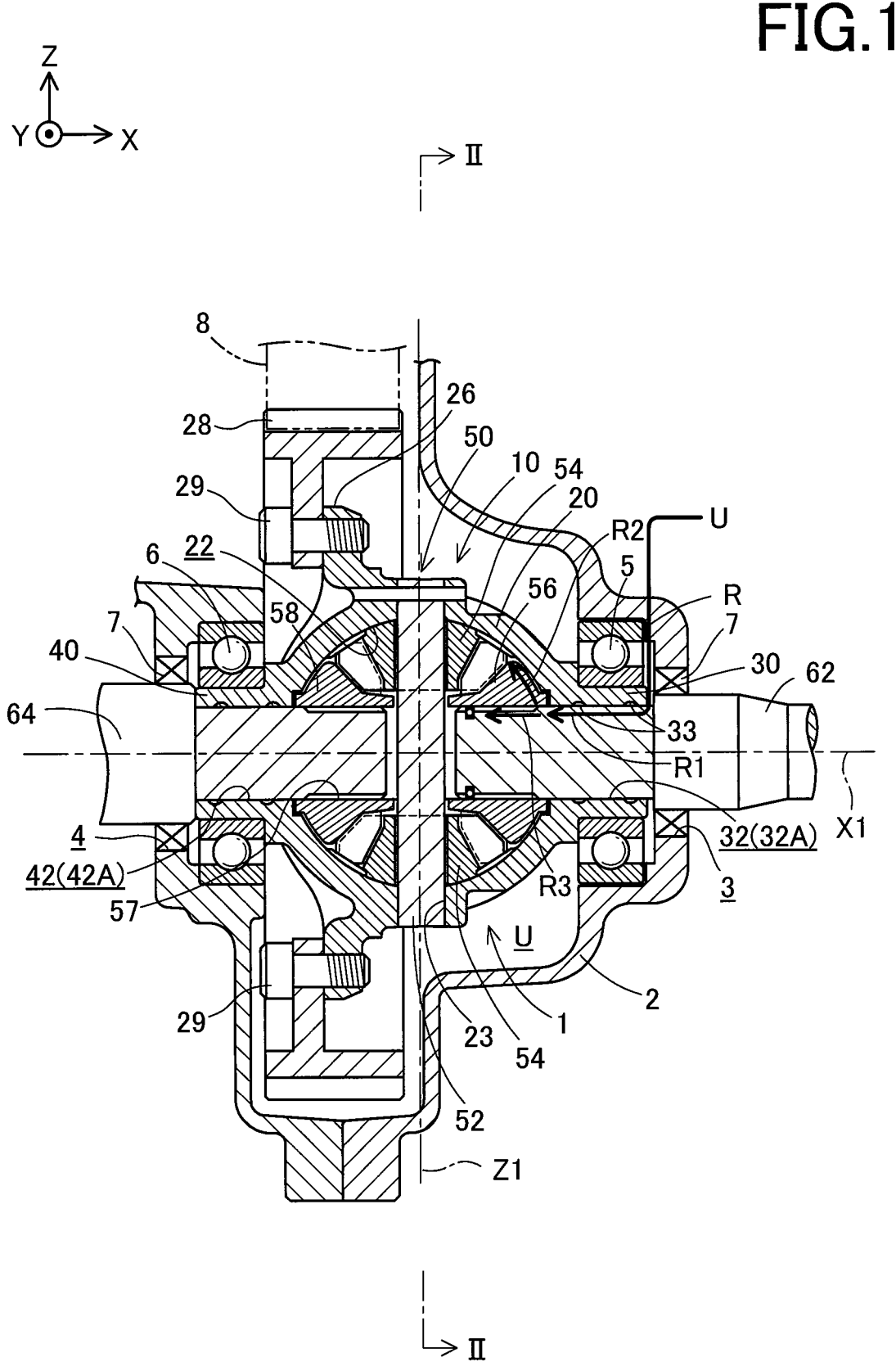
FIG. 1 is a cross-sectional view illustrating a configuration of a differential device 1 according to an embodiment.

A-1. Configuration of Differential Device 1:

FIG. 1 is a cross-sectional view illustrating a configuration of a differential device 1 according to the present embodiment. It should be noted that FIG. 1 shows a planar configuration with respect to drive shafts 62, 64 and bolts 29, which will be described later. In FIG. 1, mutually orthogonal XYZ axes for specifying directions are shown. In the present specification, for convenience, the positive Z-axis direction (upward direction of the paper) is referred to as upward direction, the negative Z-axis direction (downward direction of the paper) is referred to as downward direction, the positive X-axis direction is referred to as right direction, and the negative X-axis direction is referred to as left direction. The same applies to FIG. 2 and subsequent figures described later.

As shown in FIG. 1, the differential device 1 is housed in a transmission case 2 of an automobile, for example, together with a transmission (not shown). On the right side wall of the transmission case 2, a circular right side hole 3 is formed around a first rotation axis X1 along the left and right direction (X-axis direction), and on the left side of the right side hole 3 (inside space side of the transmission case 2), an annular right bearing 5 is disposed around the first rotation axis X1. On the left side wall of the transmission case 2, a circular left side hole 4 is formed around a first rotation axis X1, and on the right side of the left side hole 4 (inside space side of the transmission case 2), an annular left bearing 6 is disposed around the first rotation axis X1.

The differential device 1 includes a differential case 10 and a differential mechanism 50.

A-1-1. Configuration of Differential Case 10:

The differential case 10 is rotatably supported by the pair of bearings 5, 6 in the transmission case 2 and houses the differential mechanism 50 therein. Specifically, the differential case 10 includes a case main body 20 and a pair of rotary shafts (also referred to as right bearing boss 30 and left bearing boss 40). The differential case 10 is formed of a material such as a metal.

The case main body 20 is, for example, a hollow substantially spherical body. The case main body 20 is provided with a housing space 22 for housing the differential mechanism 50. On the peripheral wall of the case main body 20, a pair of openings 24 (also referred to as "access windows", see FIG. 2, described later) are formed which open from the housing space 22 to the outside of the case main body 20. The pair of access windows 24 are formed in the peripheral wall of the case main body 20 at positions opposed to each other across the first rotation axis X1. In the assembling process of the differential device 1, the components of the differential mechanism 50 are inserted into the housing space 22 of the case main body 20 through the access window 24.

On the outer peripheral surface of the case main body 20, an annular flange 26 is provided around a first rotation axis X1 and a ring gear 28 is fastened to the flange 26 through the bolt 29. The ring gear 28 is meshed with an output gear 8 of the transmission. The ring gear 28 may be joined to the flange 26 by welding or the like without using the bolt 29. The ring gear 28 may be integrally formed with the case main body 20.

The right bearing boss 30 has a cylindrical shape in which a right through-hole 32 is formed, and is configured to protrude to the right side from the right outer surface of the peripheral wall of the case main body 20. The left bearing boss 40 has a cylindrical shape in which a left through-hole 42 is formed, and is configured to protrude to the left side from the left outer surface of the peripheral wall of the case main body 20. Both the right bearing boss 30 and the left bearing boss 40 have a center axis that is substantially coincides with the first rotation axis X1. Both the right through-hole 32 of the right bearing boss 30 and the left through-hole 42 of the left bearing boss 40 communicate with the housing space 22 of the case main body 20. The right bearing boss 30 is rotatably supported by the right bearing 5 disposed in the transmission case 2, and the left bearing boss 40 is rotatably supported by the left bearing 6 disposed in the transmission case 2. Thus, the differential case 10 is rotatable about the first rotation axis X1 in the transmission case 2.

A-1-2. Configuration of Differential Mechanism 50:

The differential mechanism 50 includes a pinion shaft 52, a pair of pinion gears 54, a right side gear 56, and a left side gear 58. Both the pinion gear 54 and the side gears 56, 58 are constituted of bevel gears. The pinion shaft 52 is arranged along a second rotation axis Z1 substantially perpendicular to the first rotation axis X1, and both ends of the pinion shaft 52 are inserted and fixed in holes 23 formed through the peripheral wall of the case main body 20. The pair of pinion gears 54 are arranged so as to be separated from each other, and are rotatably supported on a pinion shaft 52 around the second rotation axis Z1. It should be noted that the pinion gears 54 are not limited to a pair, but the number thereof may be, for example, 3, 4, or more. The pinion shaft 52 may not be fixed to the differential case 10 (case main body 20), but may be fixed to, for example, the ring gear 28. The fixing method is not limited to the same method as in the present embodiment, and may be, for example, a method using a fixing tool or welding.

The right side gear 56 is positioned on the right side of the pair of pinion gears 54 and is arranged to mesh with both of the pair of pinion gears 54. In addition, the right side gear 56 is provided with a gear inner peripheral portion 57 penetrating in the direction of the first rotation axis X1, a right drive shaft 62 to be connected to a right axle (not shown) is fixed to the gear inner peripheral portion 57 by fitting, and the right axle is rotatable integrally with the right drive shaft 62. The left side gear 58 is positioned on the left side of the pair of pinion gears 54 and is arranged to mesh with both of the pair of pinion gears 54. In addition, the left side gear 58 is provided with a gear inner peripheral portion 57 penetrating in the direction of the first rotation axis X1, a left drive shaft 64 to be connected to a left axle (not shown) is fixed to the gear inner peripheral portion 57 by fitting, and the left axle is rotatable integrally with the left drive shaft 64. The right drive shaft 62 is rotatably supported by the right side hole 3 formed in the transmission case 2 via a sealing member 7. The left drive shaft 64 is rotatably supported by the left side hole 4 formed in the transmission case 2 via the sealing member 7.

A-1-3. Configuration for Supplying Lubricating Oil U to Differential Mechanism 50:

A common communication channel R1 communicating from one end to the other end of the bearing bosses 30, 40 is formed between an inner peripheral surface 32A constituting the through-holes 32, 42 of the bearing bosses 30, 40 and the outer peripheral surface of the each of the drive shafts 62, 64 (FIG. 1 shows only the common communication channel R1 on the right bearing boss 30 side). The common communication channel R1 is formed by, for example, a spiral guide groove 33 formed on the inner peripheral surface 32A of each of the bearing bosses 30, 40. One end of the common communication channel R1 (guide groove 33) communicates with, for example, an introduction channel R formed in the transmission case 2 (FIG. 1 shows only the introduction channel R on the side of the right bearing boss 30). The other end of the common communication channel R1 (guide groove 33) communicates with a communication channel between the outer peripheral surfaces of each of the side gears 56, 58 and the inner surface 21 (inner wall) of the differential case 10 (hereinafter referred to as "gear outer peripheral communication channel R2"). The other end of the common communication channel R1 also communicates with a communication channel between the gear inner peripheral portion 57 of each of the side gears 56, 58 and the outer peripheral surface of each of the drive shafts 62, 64 (hereinafter referred to as "gear inner peripheral communication channel R3"). The gear inner peripheral communication channel R3 extends to a space at the pinion shaft 52 side. The gear inner peripheral communication channel R3 is formed as follows, for example. Each of the side gears 56, 58 is spline-connected to each of the drive shafts 62, 64, and the gear inner peripheral communication channel R3 is formed by partially missing a plurality of spline teeth formed in the gear inner peripheral portion 57, for example. The guide groove 33 corresponds to the introduction groove in the claims, and the right through-hole 32 corresponds to the case through-hole in the claims.

A-1-4. Operation of Differential Device 1:

With the above configuration, in the differential device 1, when a power source (not shown) transmits a torque to the transmission to rotate the output gear 8, the ring gear 28 meshed with the output gear 8 also rotates. When the ring gear 28 rotates, the differential case 10 rotates around the first rotation axis X1 in accordance with the rotation of the ring gear 28. When the differential case 10 rotates, the right drive shaft 62 and the left drive shaft 64 are respectively rotationally driven via the pair of pinion gears 54 and the pair of side gears 56, 58.

Here, as shown in FIG. 1, the lubricating oil U is introduced into the guide grooves 33 of the bearing bosses 30, 40 of the differential case 10 through the introduction channel R. When the differential case 10 rotates, the lubricating oil U is supplied into the housing space 22 of the differential case 10 through the common communication channel R1 (the guide groove 33) by the screw pumping action by the spiral shape of the guide groove 33 in accordance with the rotation of the differential case 10. A part of the lubricating oil U supplied into the housing space 22 through the common communication channel R1 passes through the gear outer peripheral communication channel R2 to suppress the occurrence of seizure or breakage of the side gears 56, 58 and the differential case 10, and further suppress the occurrence of seizure or breakage of the pinion gear 54 and the differential case 10. Further, the rest of the lubricating oil U supplied into the housing space 22 through the common communication channel R1 passes through the gear inner peripheral communication channel R3 and flows into, for example, a space between the pinion shaft 52 and the pinion gear 54, to suppress the occurrence of seizure or breakage of the pinion shaft 52 and the pinion gear 54. As a result, it is possible to maintain smooth operation of the differential mechanism 50. Since the lubricating oil U is stored in the transmission case 2, when the differential case 10 rotates, the lubricating oil U is scattered in the transmission case 2 in accordance with the rotation of the differential case 10, and a part of the scattered lubricating oil U rebounds from, for example, the inner wall of the transmission case 2, and flows into the housing space 22 of the case main body 20 through the access window 24 formed in the case main body 20, and is supplied to the differential mechanism 50.

Figure 2:
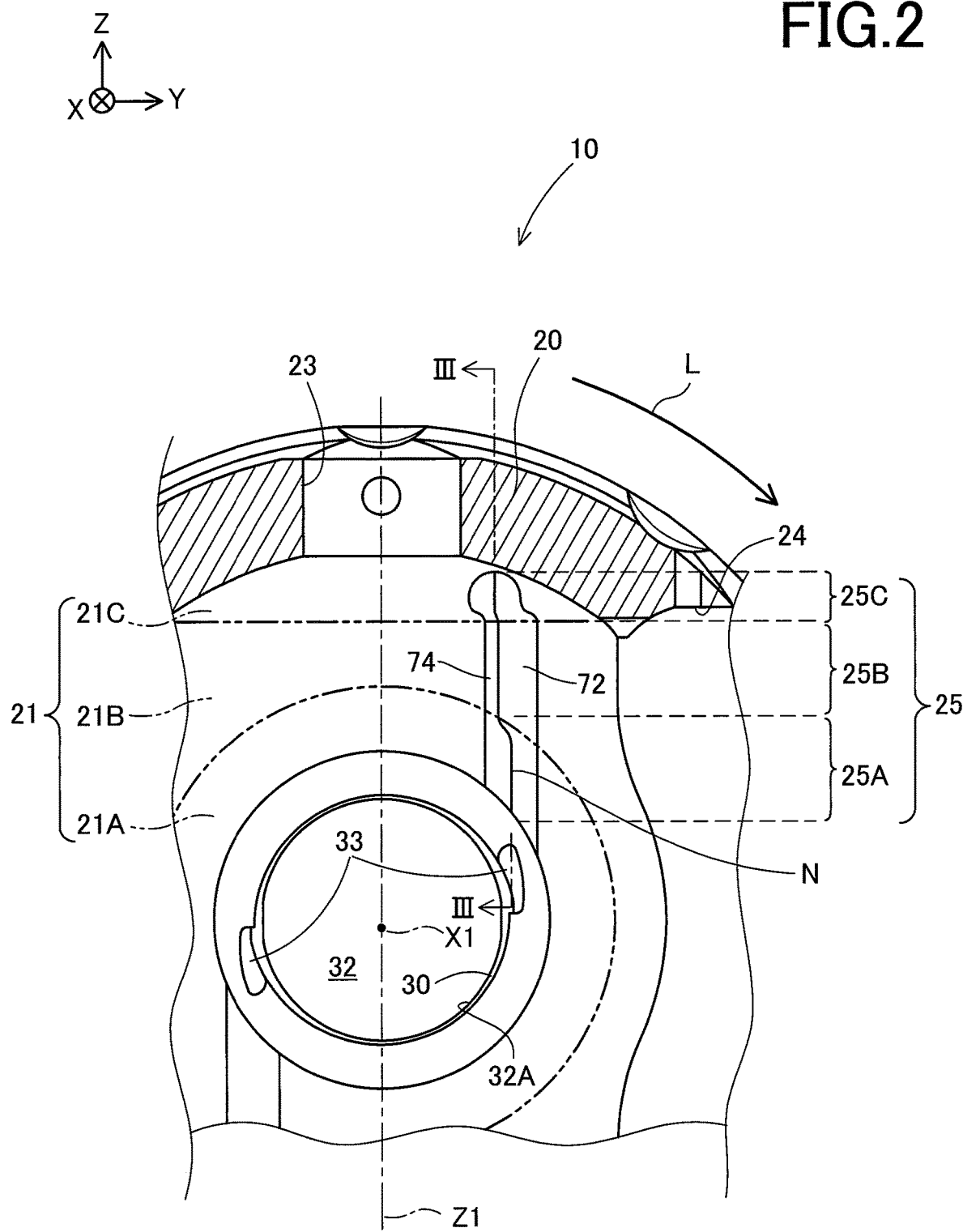
FIG. 2 is an explanatory view partially illustrating a configuration of a differential case 10 at an inner surface 21 side of a case main body 20.
Figure 3:
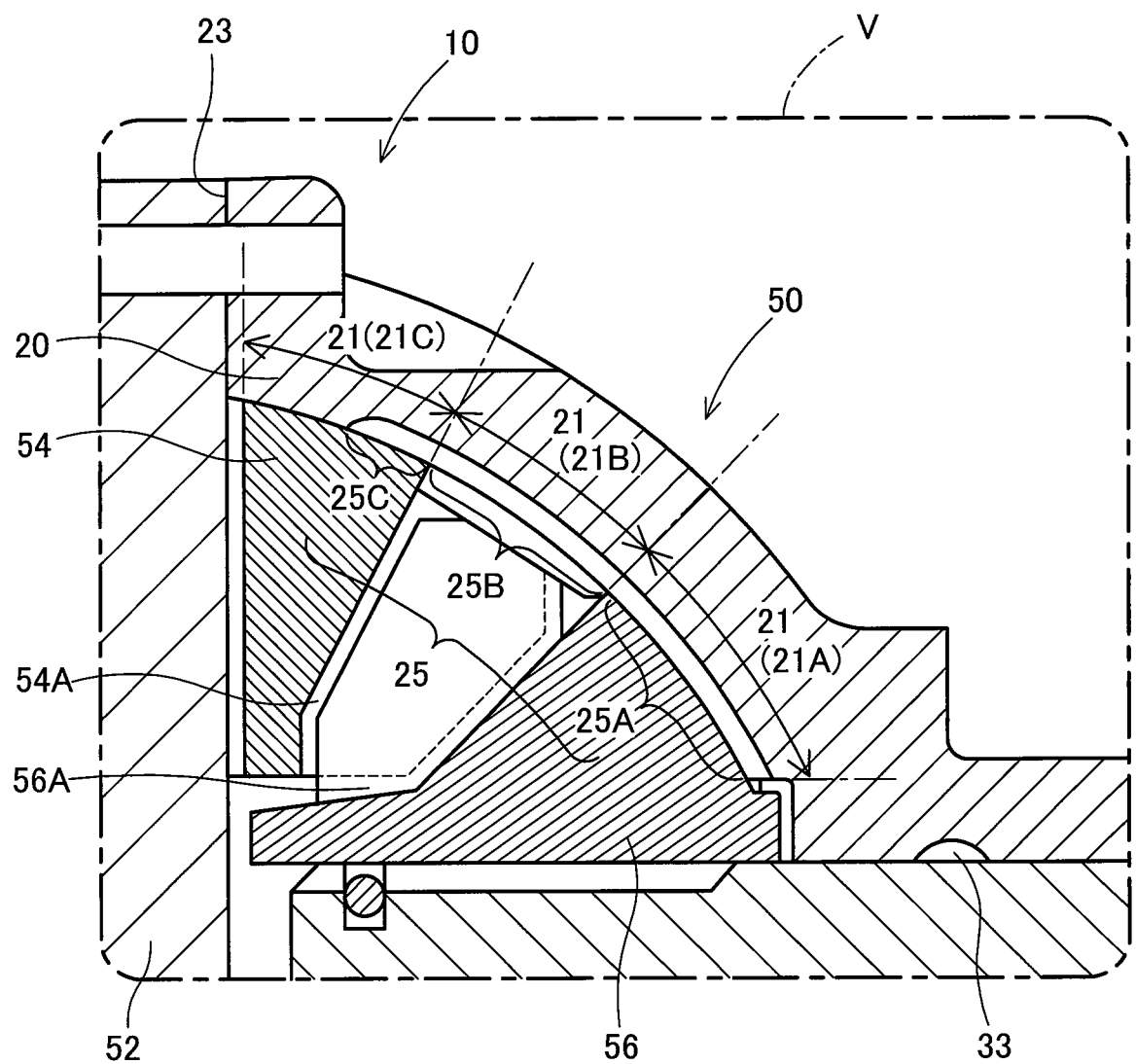
FIG. 3 is a cross-sectional view illustrating a configuration of an inner surface groove 25 taken along the line in FIG. 2.

A-2. Configuration for Supplying Lubricating Oil to Back Surface Side of Pinion Gear 54 (Space Between Back Surface of Pinion Gear and Inner Surface of Case Main Body):

A-2-1. Overall Configuration of Inner Surface Groove 25:

FIG. 2 is an explanatory view partially illustrating a configuration of the differential case 10 at the inner surface 21 side of the case main body 20. FIG. 2 shows the YZ sectional configuration of the differential case 10 taken along the line II-II in FIG. 1. In other words, FIG. 2 shows a region of the inner surface 21 of the case main body 20 at the side of the right bearing boss 30. In FIG. 2, the components housed in the differential case 10 (the pinion shaft 52, the pinion gear 54, the side gears 56, 58) are omitted. FIG. 3 is a cross-sectional view illustrating a configuration of the inner surface groove 25 taken along the line in FIG. 2. In the present embodiment, it is assumed that the clockwise direction of the first rotation axis X1 in FIG. 2 is the rotational direction (hereinafter referred to as "forward rotational direction L") during the vehicle forward movement.

As shown in FIGS. 2 and 3, the region in the right bearing boss 30 side of the inner surface 21 of the case main body 20 includes a side gear-facing region 21A, an intermediate region 21B, and a pinion gear-facing region 21C. The side gear-facing region 21A is an annular region within the inner surface 21 of the case main body 20, covered with the back surface (outer peripheral surface) of the right side gear 56 and in contact with and supporting the back surface of the right side gear 56. The back surface of the right side gear 56 is a surface of the right side gear 56 facing the inner surface 21 of the case main body 20. The intermediate region 21B is an annular region positioned outside of the inner surface 21 of the case main body 20 in the radial direction (the direction perpendicular to the first rotation axis X1) of the case main body 20 from the side gear-facing region 21A, and is not covered with either the back surface of the right side gear 56 or the back surface of the pinion gear 54. Specifically, the intermediate region 21B includes a region corresponding to a portion where the teeth 56A, 54A of the right side gear 56 and the pinion gear 54 mesh with each other. The pinion gear-facing region 21C is an annular region within the inner surface 21 of the case main body 20, positioned radially outward from the intermediate region 21B in the radial direction of the case main body 20 covered with the back surface (outer peripheral surface) of the pinion gear 54 and in contact with and supporting the back surface of the pinion gear 54. The back surface of the pinion gear 54 is a surface facing the inner surface 21 of the case main body 20 in the pinion gear 54.

As shown in FIGS. 2 and 3, an inner surface groove 25 is formed on the inner surface 21 of the case main body 20. The inner surface groove 25 communicates with the guide groove 33 formed in the right bearing boss 30, and the inner surface groove 25 extends toward the back surface side of the pinion gear 54. Here, the communication between the inner surface groove 25 and the guide groove 33 is not limited to the case where the inner surface groove 25 and the guide groove 33 directly communicate with each other, but also includes the case where the inner surface groove 25 and the guide groove 33 communicate with each other via a predetermined space (a gap between the right side gear 56 and the right bearing boss 30) (see FIG. 2). Further, it is preferable that the inner surface groove 25 extends so that the distance from the first rotation axis X1 becomes longer as it approaches the back surface side of the pinion gear 54. Thus, the centrifugal force caused by the rotation of the differential case 10 increases in a portion of the inner surface groove 25 closer to the back surface side of the pinion gear 54, and as a result, the lubricating oil U flowing from the guide groove 33 to the inner surface groove 25 mainly flows to the back surface side of the pinion gear 54 along the inner surface groove 25. Hereinafter, with regard to both ends of the inner surface groove 25, the end at the guide groove 33 side may also be referred to as "proximal end of the inner surface groove 25", and an end at the pinion gear 54 side may also be referred to as "distal end of the inner surface groove 25".

Specifically, in this embodiment, the inner surface groove 25 extends from the vicinity of the guide groove 33 formed in the right bearing boss 30, through the side gear-facing region 21A and the intermediate region 21B, to the pinion gear-facing region 21C. However, the distal end of the inner surface groove 25 does not reach the hole 23 formed in the inner surface 21 of the case main body 20. Hereinafter, in the inner surface groove 25, the portion located in the side gear-facing region 21A is referred to as "proximal side groove portion 25A", the portion located in the intermediate region 21B is referred to as "intermediate groove portion 25B", and the portion located in the pinion gear-facing region 21C is referred to as "distal side groove portion 25C". That is, in the inner surface groove 25, the proximal side groove portion 25A is a portion covered with the back surface of the right side gear 56, and the distal side groove portion 25C is a portion covered with the back surface of the pinion gear 54. The intermediate groove portion 25B is a portion not covered with either the back surface of the right side gear 56 or the back surface of the pinion gear 54.

Figure 4:
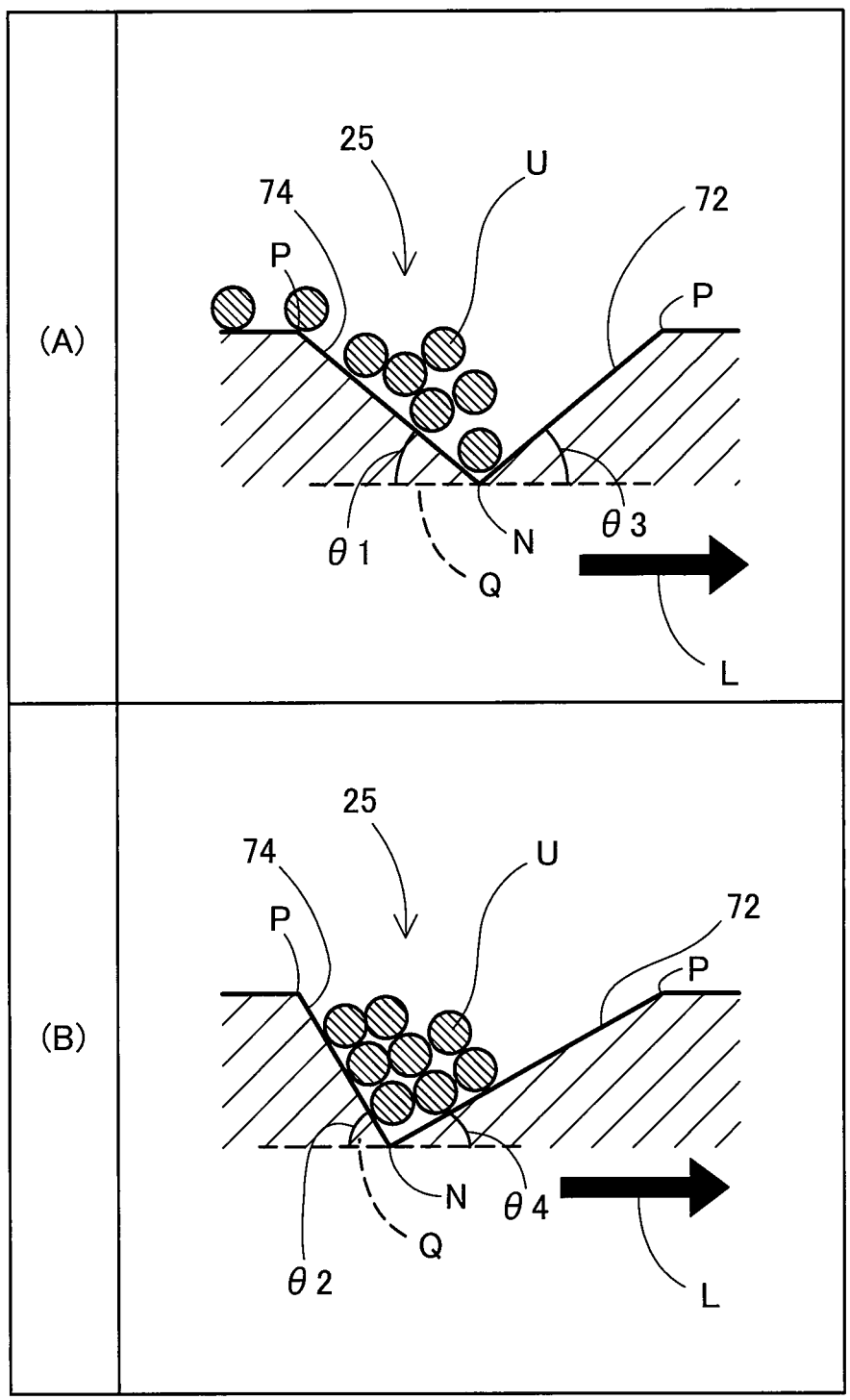
FIG. 4 is an explanatory view illustrating a cross-sectional shape of the inner surface groove 25.

A-2-2. Cross-Sectional Configuration of Inner Surface Groove 25:

FIG. 4 is an explanatory view illustrating a cross-sectional shape of the inner surface groove 25. Here, the cross-sectional shape of the inner surface groove 25 refers to a cross-sectional shape substantially perpendicular to the longitudinal direction (extending direction) of the inner surface groove 25. The second cross-sectional shape shown in FIG. 4 (B) is a shape by which the lubricating oil U is hard to climb over the inner surface groove 25 during the vehicle forward movement as compared with the first cross-sectional shape shown in FIG. 4 (A). The inner surface groove 25 is a V-shaped groove, and reference symbol N in FIGS. 2 and 4 denotes a bottom portion of the inner surface groove 25.

Specifically, the inner wall surface of the first cross-sectional shape (A) at the rear side of the forward rotational direction L (left side in FIG. 4 (A)) (hereinafter referred to as "rear inner wall surface") 74 and the inner wall surface of the second cross-sectional shape (B) at the rear side of the forward rotational direction L (left side in FIG. 4 (B)) (rear inner wall surface) 74 are substantially flat. In addition, the rear inner wall surface 74 in the second cross-sectional shape (B) is steeper than the rear inner wall surface 74 in the first cross-sectional shape (A).

The details are as follows. First, as shown in FIG. 4 (A), (B), a straight line parallel to the straight line connecting contact points P of the inner surface groove 25 and respective portions of the pair of inner surfaces 21 adjacent to the inner surface groove 25 is defined as imaginary straight line Q. Further, the inner wall surface of each of sectional shape (A) and (B) formed on the front side (right side of FIG. 4 (A), (B)) in the forward rotational direction L is referred to as "front inner wall surface" 72. Further, in the first cross-sectional shape (A), the inclination angle of the rear inner wall surface 74 with respect to the imaginary straight line Q is defined as the "first inclination angle θ1", and the inclination angle of the front inner wall surface 72 with respect to the imaginary straight line Q is defined as the "third inclination angle θ3". Further, in the second cross-sectional shape (B), the inclination angle of the rear inner wall surface 74 with respect to the imaginary straight line Q is defined as the "second inclination angle θ2", and the inclination angle of the front inner wall surface 72 with respect to the imaginary straight line Q is defined as the "fourth inclination angle θ4". The second inclination angle θ2 is larger than the first inclination angle θ1. For this reason, the second cross-sectional shape (B) has a shape by which the lubricating oil U is hard to climb over the inner surface groove 25 during the vehicle forward movement, as compared with the first cross-sectional shape (A). It should be noted that the degree of the difficulty in climbing over can be determined from the amount of the lubricating oil U flowing out of the inner surface groove 25 when the differential case 10 is rotated. For example, it can be determined that the smaller the amount of the lubricating oil U flowing out is, the harder to climb over.

In the first cross-sectional shape (A), the third inclination angle θ3 is substantially the same as the first inclination angle θ1. That is, the difficulties for the lubricating oil U to climb over the inner surface groove 25 are the same for the vehicle forward movement and the vehicle backward movement. In the second cross-sectional shape (B), the fourth inclination angle θ4 is smaller than the second inclination angle θ2. That is, the lubricating oil U can easily climb over the inner surface groove 25 during the vehicle backward movement as compared with the vehicle forward movement.

Figure 5:
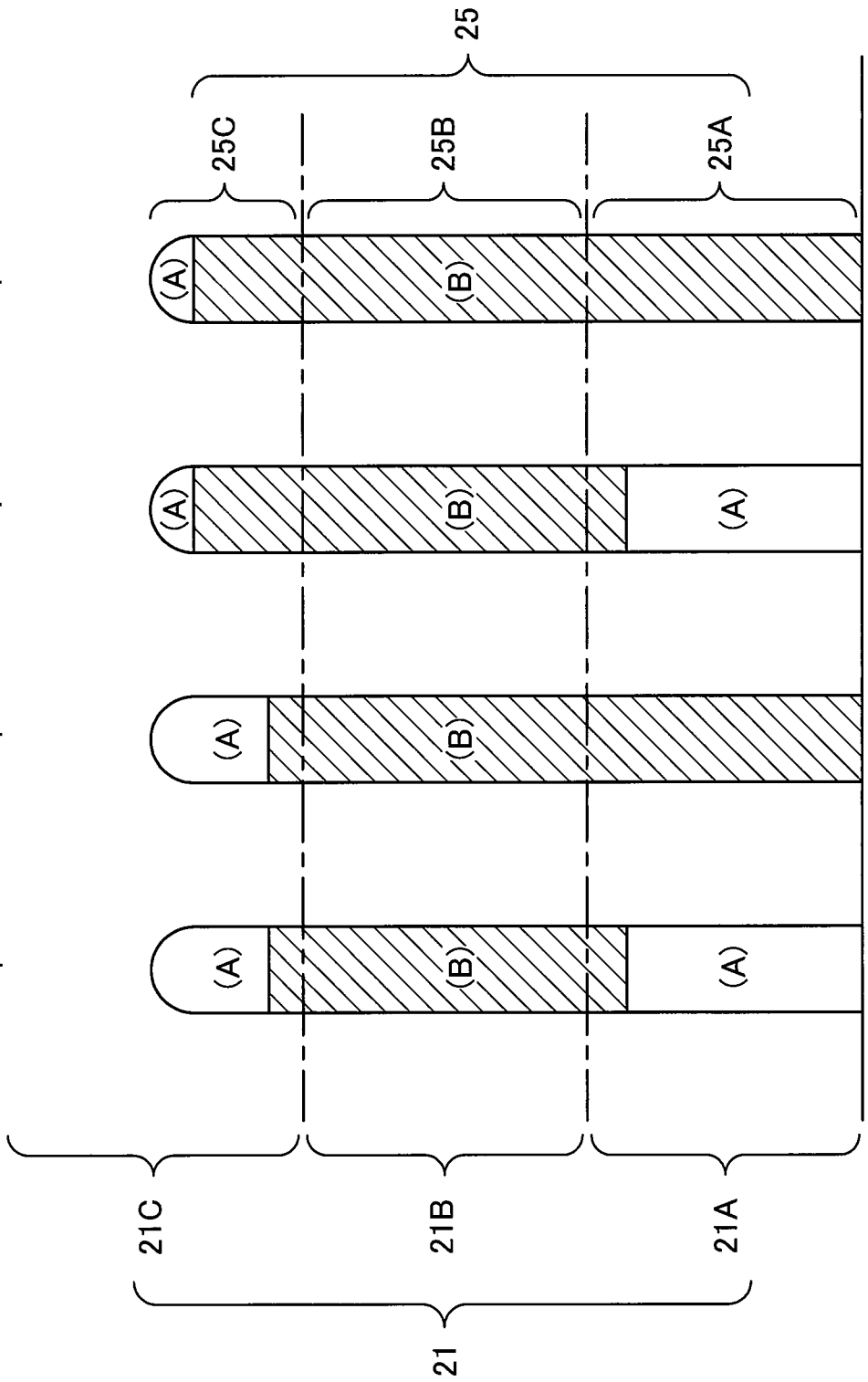
FIG. 5 is an explanatory view illustrating patterns of cross-sectional shapes of the inner surface grooves 25 in Examples 1 to 4.

FIG. 5 is an explanatory view illustrating patterns of cross-sectional shapes of the inner surface grooves 25 in Examples 1 to 4. FIG. 5 schematically illustrates, for each pattern, an arrangement relation between the inner surface groove 25 and each region (the side gear-facing region 21A, the intermediate region 21B, the pinion gear-facing region 21C) in the inner surface 21 of the case main body 20. In the inner surface groove 25 of each pattern, the cross-sectional shape of the unshaded part labeled with "(A)" is the first cross-sectional shape (A) described above, and the cross-sectional shape of the shaded part labeled with "(B)" is the second cross-sectional shape (B) described above.

Among the patterns of Examples 1 to 4, with regard to the inner surface groove 25, the arrangements of the groove portion having the first cross-sectional shape (A) and the groove portion having the second cross-sectional shape (B) are different from each other.

Example 1

As shown in FIG. 5, in the inner surface groove 25 of Example 1, the cross-sectional shapes of the unshaded parts of the proximal side groove portion 25A and the distal side groove portion 25C are the first cross-sectional shape (A), and the cross-sectional shapes of the intermediate groove portion 25B and the shaded parts of the proximal side groove portion 25A and the distal side groove portion 25C are the second cross-sectional shape (B). The unshaded part of the distal side groove portion 25C is positioned radially outside, in the radial direction of the case main body 20, from the intermediate groove portion 25B and the shaded part of the distal side groove portion 25C. In addition, the cross-sectional shape of the intermediate groove portion 25B and the shaded part of the distal side groove portion 25C is a shape over which the lubricating oil U is hard to climb during the vehicle forward movement as compared with the cross-sectional shape of the unshaded part of the distal side groove portion 25C. Thus, according to Example 1, during the vehicle forward movement, it is possible to suppress wasteful scattering of the lubricating oil U at the intermediate groove portion 25B of the inner surface groove 25, and facilitate the supply of the lubricating oil U radially outward in the inner surface groove 25 (to the distal part of the distal side groove portion 25C). As a result, it is possible to increase the amount of the lubricating oil U reaching the back surface of the pinion gear 54 so as to maintain the smooth rotation of the pinion gear 54.

Further, in Example 1, the distal side groove portion 25C is positioned in the pinion gear-facing region 21C in the inner surface 21 of the case main body 20 and is covered with the back surface of the pinion gear 54. Thus, it is possible to suppress wasteful scattering of the lubricating oil U radially inwardly in the inner surface groove 25 until the lubricating oil U reaches the back surface of the pinion gear 54, thereby increasing the amount of the lubricating oil U reaching the back surface of the pinion gear 54 so as to and maintain the smooth rotation of the pinion gear 54 more effectively.

In Example 1, the intermediate groove portion 25B is positioned between the back surface of the right side gear 56 and the back surface of the pinion gear 54. Thus, it is possible to suppress wasteful scattering of the lubricating oil U between the back surface of the right side gear 56 and the back surface of the pinion gear 54 so as to maintain smooth rotation of the pinion gear 54 by supplying sufficient lubricating oil U to the back surface side of the pinion gear 54.

In Example 1, the unshaded part of the proximal side groove portion 25A is positioned radially inward from the intermediate groove portion 25B and the shaded parts of the proximal side groove portion 25A in the radial direction of the case main body 20. Further, the cross-sectional shape of the unshaded part of the proximal side groove portion 25A is a shape over which the lubricating oil U is easy to climb during the vehicle forward movement, as compared with the cross-sectional shapes of the intermediate groove portion 25B and the shaded parts of the proximal side groove portion 25A. Thus, according to Example 1, it is possible to suppress wasteful scattering of the lubricating oil U in the intermediate groove portion 25B of the inner surface groove 25, facilitate the supply of the lubricating oil U to the distal side of the inner surface groove 25, increase the amount of the lubricating oil U scattered to the back surface side of the right side gear 56 at the proximal side groove portion 25A, and maintain smooth rotation of the right side gear 56.

In Example 1, in the inner surface groove 25, not only the entire intermediate groove portion 25B but also parts of the proximal side groove portion 25A and the distal side groove portion 25C adjacent to the intermediate groove portion 25B have the second cross-sectional shape (B). Thus, it is possible to suppress wasteful scattering of the lubricating oil U from the inner surface groove 25 during the vehicle forward movement more effectively as compared with the configuration in which a part of the intermediate groove portion 25B has the first cross-sectional shape (A) or the configuration in which only the intermediate groove portion 25B has the first cross-sectional shape (A). In Example 1, the intermediate groove portion 25B and the shaded parts in the proximal side groove portion 25A and the distal side groove portion 25C correspond to the first groove portion in the claims, the unshaded part in the distal side groove portion 25C corresponds to the second groove portion in the claims, and the unshaded part in the proximal side groove portion 25A corresponds to the third groove portion in the claims.

Example 2

Example 2 differs from Example 1 in that not only the intermediate groove portion 25B but also the entire proximal side groove portion 25A of the inner surface groove 25 has the second cross-sectional shape (B). Thus, according to the Example 2, during the vehicle forward movement, it is possible to suppress wasteful scattering of the lubricating oil U radially inwardly in the inner surface groove 25 (the intermediate groove portion 25B and the proximal side groove portion 25A), and facilitate the supply of the lubricating oil U radially outward in the inner surface groove 25 (to the distal side groove portion 25C). As a result, it is possible to increase the amount of the lubricating oil U reaching the back surface of the pinion gear 54 so as to maintain the smooth rotation of the pinion gear 54. In Example 2, the intermediate groove portion 25B, the proximal side groove portion 25A, and the shaded part in the distal side groove portion 25C correspond to the first groove portion in the claims, and the unshaded part in the distal side groove portion 25C corresponds to the second groove portion in the claims.

Example 3

Example 3 differs from Example 2 in that only the distal part of the distal side groove portion 25C of the inner surface groove 25 has the first cross-sectional shape (A), and the part closer to the intermediate groove portion 25B than the distal part has the second cross-sectional shape (B). Thus, according to Example 3, during the vehicle forward movement, it is possible to suppress wasteful scattering of the lubricating oil U in the intermediate groove portion 25B, the proximal side groove portion 25A, and the middle part of the distal side groove portion 25C of the inner surface groove 25, and facilitate the supply of the lubricating oil U to the distal part of the inner surface groove 25. As a result, it is possible to increase the amount of the lubricating oil U reaching the space between the pinion shaft 52 and the pinion gear 54 so as to maintain the smooth rotation of the pinion gear 54. In Example 3, the intermediate groove portion 25B and the shaded parts in the proximal side groove portion 25A and the distal side groove portion 25C correspond to the first groove portion in the claims, the unshaded part in the distal side groove portion 25C corresponds to the second groove portion in the claims, and the unshaded part in the proximal side groove portion 25A corresponds to the third groove portion in the claims.

Example 4

Example 4 differs from Example 3 in that not only the intermediate groove portion 25B but also the entire proximal side groove portion 25A of the inner surface groove 25 has the second cross-sectional shape (B). Thus, according to Example 4, during the vehicle forward movement, it is possible to suppress wasteful scattering of the lubricating oil U in the intermediate groove portion 25B, the proximal side groove portion 25A, and the middle of the distal side groove portion 25C of the inner surface groove 25, and facilitate the supply of the lubricating oil U to the distal part of the inner surface groove 25. As a result, it is possible to increase the amount of the lubricating oil U reaching the space between the pinion shaft 52 and the pinion gear 54 so as to maintain the smooth rotation of the pinion gear 54. In Example 4, the intermediate groove portion 25B, the proximal side groove portion 25A, and the shaded part in the distal side groove portion 25C correspond to the first groove portion in the claims, and the unshaded part in the distal side groove portion 25C corresponds to the second groove portion in the claims.

In the inner surface groove 25, the inner wall surfaces of the groove portion having the first cross-sectional shape (A) and the groove portion having the second cross-sectional shape (B) may be connected to each other via a step; however, in view of the smooth supply of the lubricating oil U, it is preferable that the inner wall surfaces of both groove portions are continuously connected to each other via a curved surface without a step (see FIG. 2). As shown in FIG. 5, the connecting portion (transition portion) between the groove portion having the first cross-sectional shape (A) and the groove portion having the second cross-sectional shape (B) is preferably disposed in the inner surface groove 25 other than the intermediate groove portion 25B. Thus, it is possible to suppress scattering of the lubricating oil U in the intermediate region 21B more effectively. Further, as shown in FIG. 4, when the differential case 10 is rotated in the forward rotational direction L, the lubricating oil U is biased toward the rear inner wall surface 74 of the inner surface groove 25, so that if there is a protruding step on the rear inner wall surface 74, the supply of the lubricating oil U to the rear side of the pinion gear 54 might be impeded. Therefore, as shown in FIG. 2, it is preferable that the rear inner wall surface 74 of the intermediate groove portion 25B is positioned at the rear side in the forward rotational direction L with respect to the rear inner wall surface 74 of the proximal side groove portion 25A so that the rear inner wall surface 74 of the connecting portion (transition portion) does not have a protruding step. Further, it is preferable that the rear inner wall surface 74 of the distal side groove portion 25C is positioned at the rear side in the forward rotational direction L with respect to the rear inner wall surface 74 of the intermediate groove portion 25B so that the rear inner wall surface 74 of the connecting portion (transition portion) does not have a protruding step. Thus, it is possible to suppress the reduction of the supply efficiency of the lubricating oil U at the connecting portion between the groove portion having the first cross-sectional shape (A) and the groove portion having the second cross-sectional shape (B) in the inner surface groove 25. As shown in FIG. 2, the bottom portions N of the proximal side groove portion 25A, the intermediate groove portion 25B, and the distal side groove portion 25C are continuously connected over the entire length of the inner surface groove 25.

B. Modifications

The present invention is not limited to the embodiments described above, and can be modified in various forms without departing from the spirit and scope thereof, and for example, the following modifications are also possible.

The configuration of the differential case 10 in the above embodiment is merely an example and can be variously modified. For example, although the differential case 10 of the above embodiment has a configuration in which a pair of access windows 24 are formed, it may have a configuration in which only one access window 24 is formed, a configuration in which three or more access windows 24 are formed, or a configuration in which no access window 24 is formed. Further, although the space (common communication channel R1) between the inner peripheral surfaces 32A, 42A constituting the through-holes 32, 42 of the bearing bosses 30, 40 and the outer peripheral surfaces of the respective drive shafts 62, 64 is formed of a spiral guide groove 33 in the above embodiment, this space may be formed of, for example, a groove linearly extending along the direction of the first rotation axis X1.

Figure 6:
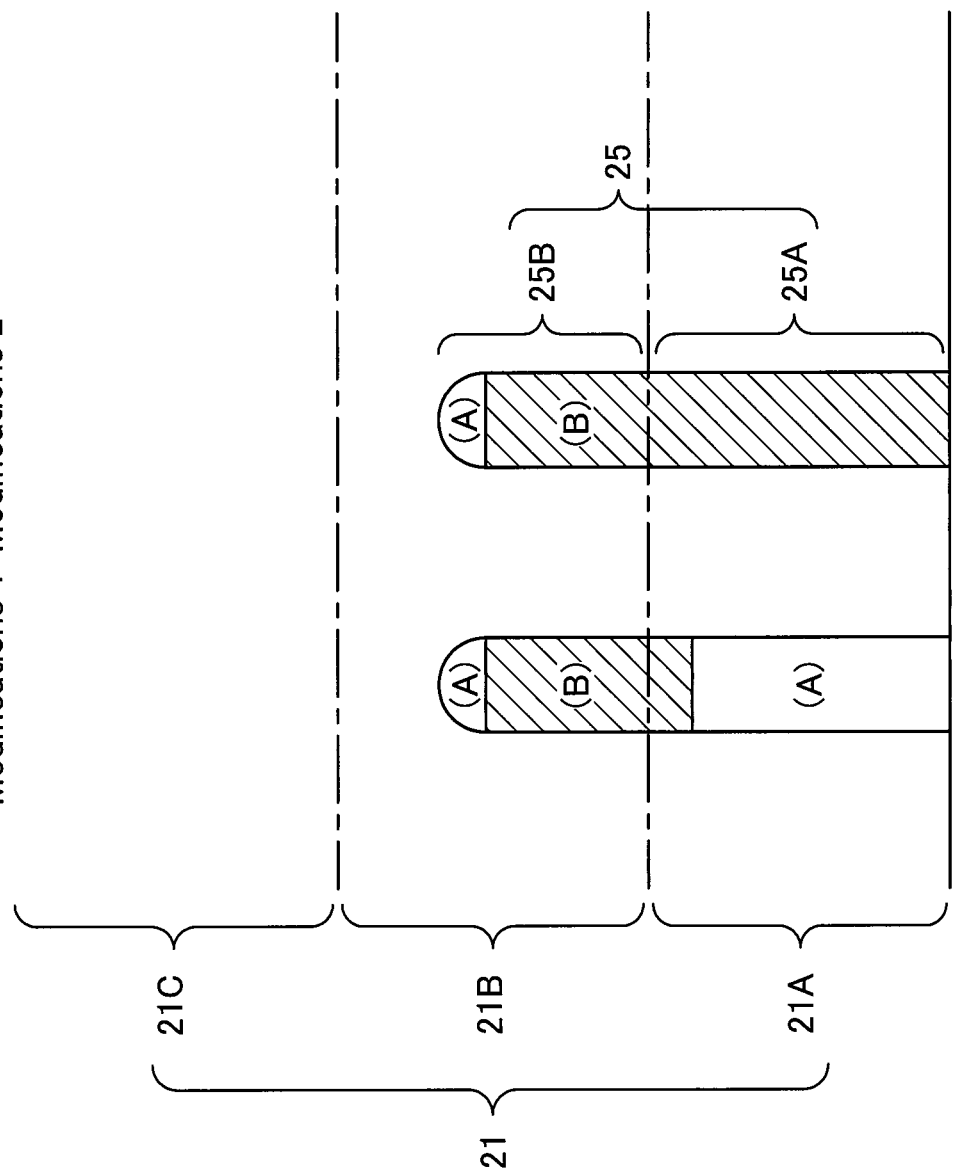
FIG. 6 is an explanatory view illustrating patterns of cross-sectional shapes of the inner surface grooves 25 in Modifications 1 and 2.

FIG. 6 is an explanatory view illustrating patterns of cross-sectional shapes of the inner surface groove 25 in Modifications 1 and 2. FIG. 6 schematically shows, for each pattern, an arrangement relation between the inner surface groove 25 and each region (the side gear-facing region 21A and the intermediate region 21B) in the inner surface 21 of the case main body 20. The meanings of "(A)" and "(B)" in FIG. 6 and the presence or absence of shading are the same as those in FIG. 5. Modifications 1 and 2 differ from Examples 1 to 4 in that the inner surface groove 25 has the proximal side groove portion 25A and the intermediate groove portion 25B, but does not have the distal side groove portion 25C. That is, in Modifications 1 and 2, the inner surface groove 25 extends from the vicinity of the guide groove 33 formed in the right bearing boss 30 through the side gear-facing region 21A so that the distal end of the inner surface groove 25 ends in a middle portion of the intermediate region 21B. Between the patterns of Modifications 1 and 2, with regard to the inner surface groove 25, the arrangements of the groove portion having the first cross-sectional shape (A) and the groove portion having the second cross-sectional shape (B) are different from each other.

Modification 1

As shown in FIG. 6, in Modification 1, in the inner surface groove 25, the cross-sectional shapes of the unshaded parts in the proximal side groove portion 25A and the intermediate groove portion 25B are the first cross-sectional shape (A), and the cross-sectional shapes of the shaded parts in the proximal side groove portion 25A and the intermediate groove portion 25B are the second cross-sectional shape (B). The unshaded part of the intermediate groove portion 25B is positioned radially outward from the intermediate groove portion 25B and the shaded part of the proximal side groove portion 25A in the radial direction of the case main body 20. Thus, according to Modification 1, during the vehicle forward movement, it is possible to suppress wasteful scattering of the lubricating oil U at the most proximal side of the intermediate groove portion 25B of the inner surface groove 25, and facilitate the supply of the lubricating oil U to the distal part of the intermediate groove portion 25B of the inner surface groove 25. As a result, it is possible to increase the amount of the lubricating oil U reaching the back surface of the pinion gear 54 so as to maintain the smooth rotation of the pinion gear 54.

Further, in Modification 1, the unshaded part of the proximal side groove portion 25A is positioned radially inward from the intermediate groove portion 25B and the shaded part of the proximal side groove portion 25A in the radial direction of the case main body 20. Thus, it is possible to increase the amount of the lubricating oil U reaching the back surface of the right side gear 56 at the most proximal side of the proximal side groove portion 25A so as to maintain the smooth rotation of the right side gear 56. In Modification 1, the shaded parts in the intermediate groove portion 25B and the proximal side groove portion 25A correspond to the first groove portion in the claims, the unshaded part in the intermediate groove portion 25B corresponds to the second groove portion in the claims, and the unshaded part in the proximal side groove portion 25A corresponds to the third groove portion in the claims.

Modification 2

Modification 2 differs from Modification 1 in that not only the intermediate groove portion 25B but also the entire proximal side groove portion 25A of the inner surface groove 25 has the second cross-sectional shape (B). Thus, according to Modification 2, during the vehicle forward movement, it is possible to suppress wasteful scattering of the lubricating oil U radially inward in the inner surface groove 25 (the proximal side of the intermediate groove portion 25B and the proximal side groove portion 25A) so as to facilitate the supply of the lubricating oil U radially outward in the inner surface groove 25 (to the distal part of the intermediate groove portion 25 B). As a result, it is possible to increase the amount of the lubricating oil U reaching the back surface of the pinion gear 54 so as to maintain the smooth rotation of the pinion gear 54. In Modification 2, the shaded part of the intermediate groove portion 25B and the proximal side groove portion 25A correspond to the first groove portion in the claims, and the unshaded part of the intermediate groove portion 25B corresponds to the second groove portion in the claims.

Figure 7:
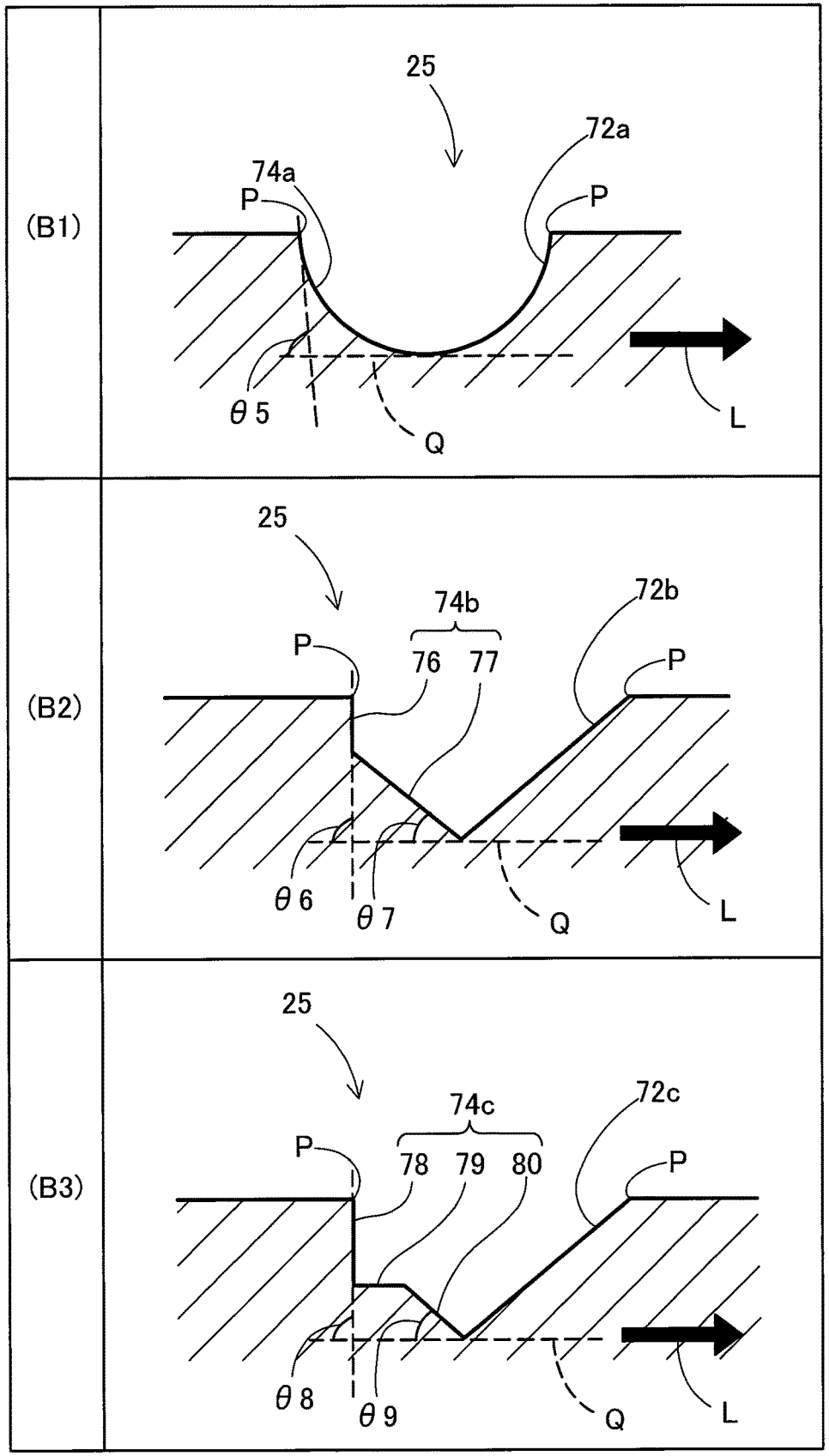
FIG. 7 is an explanatory view illustrating a cross-sectional shapes of the inner surface grooves 25 in Modifications 3 to 5.

FIG. 7 is an explanatory view illustrating the second cross-sectional shapes (B1 to B3) of the inner surface grooves 25 in Modifications 3 to 5. As shown in FIG. 7 (B1), the second cross-sectional shape (B1) in Modification 3 differs from the second cross-sectional shape (B) (see FIG. 4 (B)) in the above embodiment in that the rear inner wall surface 74a is not flat but a curved surface. Specifically, in Modification 3, the second cross-sectional shape (B1) is an arc shape. The fifth inclination angle θ5, which is the inclination angle of the opening side (near the contact point P) on the rear inner wall surface 74a of the second cross-sectional shape (B1) with respect to the imaginary straight line Q, is larger than the first inclination angle θ1 (see FIG. 4 (A)) of the first cross-sectional shape (A) in the above embodiment.

As shown in FIG. 7 (B2, B3), the second cross-sectional shapes (B2, B3) in Modifications 4 and 5 are different from the second cross-sectional shape (B) in the above embodiment in that the rear inner wall surfaces 74b and 74c are formed of a plurality of flat surfaces. In Modification 4, the rear inner wall surface 74b is composed of two flat surfaces (a first flat surface 76 and a second flat surface 77). In the two flat surfaces, at least the sixth inclination angle θ6, which is an inclination angle of the first flat surface 76 near the contact point P with respect to the imaginary straight line Q, is larger than the first inclination angle θ1 of the first cross-sectional shape (A) in the above embodiment. In Modification 4, the seventh inclination angle θ7, which is the inclination angle of the second flat surface 77 separated from the contact point P with respect to the imaginary straight line Q, is also larger than the first inclination angle θ1 of the first cross-sectional shape (A) in the above-described embodiment. However, the seventh inclination angle θ7 may be the same as or smaller than the first inclination angle θ1.

In Modification 5, the rear inner wall surface 74c is composed of three surfaces (a third flat surface 78, a fourth flat surface 79, a fifth flat surface 80). In the three flat surfaces, at least the eighth inclination angle θ8, which is the inclination angle of the third flat surface 78 closest to the contact point P with respect to the imaginary straight line Q, is larger than the first inclination angle θ1 of the first cross-sectional shape (A) in the above embodiment. In Modification 5, the ninth inclination angle θ9, which is the inclination angle of the fifth flat surface 80 separated from the contact point P with respect to the imaginary straight line Q, is also larger than the first inclination angle θ1 of the first cross-sectional shape (A) in the above embodiment. However, the ninth inclination angle θ9 may be the same as or smaller than the first inclination angle θ1. In Modification 5, the inclination angle of the fourth flat surface 79 separated from the contact point P with respect to the imaginary straight line Q is smaller than the first inclination angle θ1 of the first cross-sectional shape (A) in the above embodiment. However, the inclination angle of the fourth flat surface 79 may be the same as or larger than the first inclination angle θ1. In summary, when the inclination angle of the surface portion (in the case of a curved surface, the tangential line of the curved surface) located near the contact point P among the rear inner wall surfaces 74a to 74c of the second cross-sectional shapes (B1 to B3) with respect to the imaginary straight line Q is larger than the first inclination angle θ1 of the first cross-sectional shape (A), the lubricating oil U is difficult to climb over the inner surface groove 25 during the vehicle forward movement. The rear inner wall surface 74 may be formed of four or more surfaces (flat surfaces or curved surfaces).

In the above embodiment, an example in which the present invention is applied to the inner surface groove 25 formed in a region at the right bearing boss 30 side of the inner surface 21 of the case main body 20 is described, but the present invention may be applied to an inner surface groove formed in a region at the left bearing boss 40 side of the inner surface 21 of the case main body 20.

In the above embodiment, the rear inner wall surface 74 in the second cross-sectional shape (B) is made steeper than the rear inner wall surface 74 in the first cross-sectional shape (A) to implement a shape by which the lubricating oil U is hard to climb over the inner surface groove 25 during the vehicle forward movement. However, the present invention is not limited to this embodiment, and for example, the inclination angles of the rear inner wall surface 74 of the first cross-sectional shape (A) and the second cross-sectional shape (B) may be the same, and the surface roughness (surface resistance) of the rear inner wall surface 74 in the second cross-sectional shape (B) may be higher than the surface roughness of the rear inner wall surface 74 in the first cross-sectional shape (A) so as to implement a shape by which the lubricating oil U is hard to climb over the inner surface groove 25 during the vehicle forward movement.

In the above embodiment, the second cross-sectional shape (B) makes it easier for the lubricating oil U to climb over the inner surface groove 25 during the vehicle backward movement as compared with the vehicle forward movement. However, the second cross-sectional shape (B) may be configured such that the difficulties for the lubricating oil U in climbing over during the vehicle backward movement and the vehicle forward movement are in the same degree. For example, in the second cross-sectional shape (B), the fourth inclination angle θ4 of the front inner wall surface 72 may be larger than the first inclination angle θ1 of the rear inner wall surface 74 in the first cross-sectional shape (A), or larger than the third inclination angle θ3 of the front inner wall surface 72. It should be noted that, since the rotational speed of the differential case 10 and the frequency of the vehicle backward movement is lower than those of the vehicle forward movement, even if the present invention is not applied to the front inner wall surface 72 (the front inner walls 72a, 72b, 72c in FIG. 7) of the inner surface groove 25 as shown in FIG. 4, the amount of scattering of the lubricating oil U and the influence on smooth rotational operation of the pinion gear 54 or the like is small.

In the above embodiment, a thrust washer (not shown) may be disposed between the back surface of the right side gear 56 and the inner surface 21 of the differential case 10.

DESCRIPTION OF REFERENCE CHARACTERS 1 differential device, 2 transmission case, 3 right side hole, 4 left side hole, 5 right bearing, 6 left bearing, 7 sealing member, 8 output gear, 10 differential case, 20 case main body, 21 inner surface, 21A side gear-facing region, 21B intermediate region, 21C pinion gear-facing region, 22 housing space, 23 hole, 24 access window, 25 inner surface groove, 25A proximal side groove portion, 25B intermediate groove portion, 25C distal side groove portion, 26 flange, 28 ring gear, 29 bolt, 30 right bearing boss, 32 right through-hole (case through-hole), 32A, 42A inner peripheral surface, 33 guide groove (introduction groove), 40 left bearing boss, 42 left through-hole, 50 differential mechanism, 52 pinion shaft, 54 pinion gear, 54A, 56A teeth, 56 right side gear, 57 gear inner peripheral portion, 58 left side gear, 62 right drive shaft, 64 left drive shaft, 72 front inner wall surface, 74, 74a to 74c rear inner wall surface, 76 first flat surface, 77 second flat surface, 78 third flat surface, 79 fourth flat surface, 80 fifth flat surface, L forward rotational direction, N bottom portion, P contact, Q imaginary straight line, R1 common communication channel, R2 gear outer peripheral communication channel, R3 gear inner peripheral communication channel, R introduction channel, U lubricating oil, X1 first rotation axis, Z1 second rotation axis.

The invention claimed is:
1. A differential device comprising:
a differential case including a case main body in which a housing space is formed, and a bearing boss protruding from the case main body, having a cylindrical shape with a case through-hole communicating with the housing space, and being rotatably supported about a first rotation axis;
a side gear housed in the housing space of the differential case and rotatably arranged about the first rotation axis; and
a pinion gear housed in the housing space of the differential case, rotatably arranged about a second rotation axis perpendicular to the first rotation axis, and meshing with the side gear,
wherein an introduction groove for introducing lubricating oil into the housing space of the case main body is formed on an inner peripheral surface of the bearing boss,
wherein an inner surface groove communicating with the introduction groove and extending toward a back surface side of the pinion gear is formed on an inner surface of the case main body,
wherein the inner surface groove includes a first groove portion and a second groove portion positioned radially outward from the first groove portion in the radial direction of the case main body, and wherein a shape of at least a part of the first groove portion is a shape over which the lubricating oil is harder to climb during vehicle forward movement as compared with the shape of the second groove portion.

2. The differential device according to claim 1,
wherein an inner wall surface at the rear side of at least a part of the first groove portion in a forward rotational direction, which is a rotational direction of the differential case during the vehicle forward movement, is steeper than an inner wall surface at the rear side of the second groove portion in the forward rotational direction.

3. The differential device according to claim 1,
wherein the inner surface groove has a third groove portion positioned radially inward from the first groove portion,
wherein a shape of at least a part of the third groove portion is a shape over which the lubricating oil is easier to climb during the vehicle forward movement as compared with the shape of the first groove portion, and
wherein the third groove portion is covered with a back surface of the side gear.

4. The differential device according to claim 3,
wherein an inner wall surface at a rear side of at least a part of the third groove portion in a forward rotational direction, which is the rotational direction of the differential case during the vehicle forward movement, is inclined more gently than an inner wall surface at the rear side of the first groove portion in the forward rotational direction.

5. The differential device according to claim 1,
wherein the second groove portion is covered with the back surface of the pinion gear.

6. The differential device according to claim 1,
wherein the first groove portion is positioned between a back surface of the side gear and the back surface of the pinion gear.

7. The differential device according to claim 2,
wherein the inner surface groove has a third groove portion positioned radially inward from the first groove portion,
wherein a shape of at least a part of the third groove portion is a shape over which the lubricating oil is easier to climb during the vehicle forward movement as compared with the shape of the first groove portion, and
wherein the third groove portion is covered with a back surface of the side gear.

8. The differential device according to claim 2,
wherein the second groove portion is covered with the back surface of the pinion gear.

9. The differential device according to claim 3,
wherein the second groove portion is covered with the back surface of the pinion gear.

10. The differential device according to claim 2,
wherein the first groove portion is positioned between a back surface of the side gear and the back surface of the pinion gear.

11. The differential device according to claim 3,
wherein the first groove portion is positioned between a back surface of the side gear and the back surface of the pinion gear.

12. The differential device according to claim 3, wherein an inner wall surface at a rear side of at least a part of the third groove portion in a forward rotational direction, which is a rotational direction of the differential case during the vehicle forward movement, is inclined more gently than an inner wall surface at a rear side of the first groove portion in the forward rotational direction.

13. The differential device according to claim 12, wherein the first groove portion is positioned between a back surface of the side gear and the back surface of the pinion gear.

14. The differential device according to claim 7, wherein an inner wall surface at a rear side of at least a part of the third groove portion in a forward rotational direction, which is a rotational direction of the differential case during the vehicle forward movement, is inclined more gently than an inner wall surface at a rear side of the first groove portion in the forward rotational direction.

15. A differential device comprising:
a differential case including a case main body in which a housing space is formed, and a bearing boss protruding from the case main body, having a cylindrical shape with a case through-hole communicating with the housing space, and being rotatably supported about a first rotation axis;
a side gear housed in the housing space of the differential case and rotatably arranged about the first rotation axis; and
a pinion gear housed in the housing space of the differential case, rotatably arranged about a second rotation axis perpendicular to the first rotation axis, and meshing with the side gear,
wherein an introduction groove for introducing lubricating oil into the housing space of the case main body is formed on an inner peripheral surface of the bearing boss,
wherein an inner surface groove communicating with the introduction groove and extending toward a back surface side of the pinion gear is formed on an inner surface of the case main body,
wherein the inner surface groove includes a first groove portion and a third groove portion positioned radially inward from the first groove portion in the radial direction of the case main body, and
wherein a shape of at least a part of the first groove portion is a shape over which the lubricating oil is harder to climb during vehicle forward movement as compared with the shape of the third groove portion.

16. The differential device according to claim 15, wherein an inner wall surface at a rear side of at least a part of the third groove portion in a forward rotational direction, which is a rotational direction of the differential case during the vehicle forward movement, is inclined more gently than an inner wall surface at a rear side of the first groove portion in the forward rotational direction.

17. The differential device according to claim 15, wherein the third groove portion is covered with a back surface of the side gear.

18. The differential device according to claim 15, wherein the first groove portion is positioned between a back surface of the side gear and a back surface of the pinion gear.

19. The differential device according to claim 16, wherein the first groove portion is positioned between a back surface of the side gear and a back surface of the pinion gear.

20. The differential device according to claim 17, wherein the first groove portion is positioned between a back surface of the side gear and a back surface of the pinion gear.

* * * * *